(12) United States Patent
Bai et al.

(10) Patent No.: US 7,769,256 B2
(45) Date of Patent: Aug. 3, 2010

(54) METHOD AND SYSTEM FOR PERFORMANCE MONITOR FOR DIGITAL OPTICAL DWDM NETWORKS

(75) Inventors: Yu Sheng Bai, Los Altos, CA (US); Xiao Andy Shen, San Bruno, CA (US)

(73) Assignee: FutureWei Technologies, Inc., Plano, TX (US)

( * ) Notice: Subject to any disclaimer, the term of this patent is extended or adjusted under 35 U.S.C. 154(b) by 435 days.

(21) Appl. No.: 11/953,828

(22) Filed: Dec. 10, 2007

(65) Prior Publication Data

US 2008/0253762 A1    Oct. 16, 2008

Related U.S. Application Data

(60) Provisional application No. 60/911,848, filed on Apr. 13, 2007.

(51) Int. Cl.
*G02B 6/28* (2006.01)
(52) U.S. Cl. ............................... 385/24; 385/14; 385/15; 385/16
(58) Field of Classification Search .................... 385/14, 385/15, 16, 24
See application file for complete search history.

(56) References Cited

U.S. PATENT DOCUMENTS

| | | | |
|---|---|---|---|
| 6,122,095 A * | 9/2000 | Fatehi | ........................ 359/337 |
| 6,262,822 B1 | 7/2001 | Obhi et al. | |
| 6,310,703 B1 | 10/2001 | Alavie et al. | |
| 6,344,910 B1 | 2/2002 | Cao | |
| 7,113,667 B2 | 9/2006 | Welch et al. | |
| 7,123,786 B2 | 10/2006 | Welch et al. | |
| 7,542,479 B2 * | 6/2009 | Zeng et al. | ................... 370/466 |
| 2004/0161242 A1 | 8/2004 | Xu | |

FOREIGN PATENT DOCUMENTS

CN    1419355 A1    5/2003

(Continued)

OTHER PUBLICATIONS

Hashimoto, Toshikazu et al., "Multichip Optical Hybrid Integration Technique With Planar Lightwave Circuit Platform," Journal of Lightwave Technology, vol. 16, No. 7, pp. 1249-1258, Jul. 1998.

(Continued)

*Primary Examiner*—Jennifer Doan
(74) *Attorney, Agent, or Firm*—Slater & Matsil, L.L.P.

(57) ABSTRACT

A system for performance monitoring for a DWDM network. The system includes a photonic integrated device configured to receive an optical signal and output a first plurality of electrical signals for a plurality of channels respectively. The system also includes a clock and data recovery device configured to receive the first plurality of electric signals. Additionally, the system includes a switch device coupled to the first clock and data recovery device without an error correction device in between. The switch includes a first interface to output a second plurality of electrical signals and a second interface to add or drop one or more channel devices. The switch also includes an output port configured to provide information associated with the plurality of channels. An error detection device is coupled to the output port and is configured to monitor and report performance of the channels.

22 Claims, 5 Drawing Sheets

FOREIGN PATENT DOCUMENTS

| | | |
|---|---|---|
| CN | 1464671 A | 12/2003 |
| CN | 1625091 A | 6/2005 |
| EP | 1436931 B1 | 12/2005 |
| WO | WO 2008/043288 A1 | 4/2008 |
| WO | WO 2008/043318 A1 | 4/2008 |
| WO | WO 2008/049372 A1 | 5/2008 |

OTHER PUBLICATIONS

Seki, K. et al., "Single-Chip FEC Codec Using a Concatenated BCH Code for 10 Gb/s Long-Haul Optical Transmission Systems," IEEE, pp. 279-282, 2003.

Soole, J.B.D. et al., "Multipurpose Reconfigurable Optical Add-Drop Multiplexer (ROADM)," Optical Communication, vol. 5, pp. 1-2, 2002.

Tebben, Daniel et al., "Two-Fiber Optical Shared Protection Ring With Bi-Directional 4x4 Optical Switch Fabrics," IEEE, pp. 228-229, 2001.

Su Hwan Oh et al. "Fabrication of WDM-PON OLT Source using External Cavity Laser" COIN-NGNCON 2006. The Joint International Conference on Optical Internet and Next Generation Network, Jul. 9-13, 2006, Jeju, South Korea, IEEE, Piscataway, NJ, USA, Jul. 9, 2006, pp. 217-219, XP031232233, 4 pages.

International Search Report mailed May 15, 2008; International Application No. PCT/CN2008/070421, 12 pages.

European Search Report mailed Nov. 5, 2009; European Application No. 08715157.7, 8 pages.

International Search Report and Written Opinion of PCT Application No. PCT/CN2008/070633, mailed on Jul. 10, 2008, 6 pages total.

\* cited by examiner

METHOD AND SYSTEM FOR PERFORMANCE MONITOR FOR DIGITAL OPTICAL DWDM NETWORKS

CROSS-REFERENCES TO RELATED APPLICATIONS

This application claims priority to U.S. Provisional Application No. 60/911,848, filed Apr. 13, 2007, commonly assigned, incorporated by reference herein for all purposes. This application is also related to U.S. patent application Ser. No. 11/857,990 filed Sep. 19, 2007, commonly assigned, incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a system and method for cost-effective digital performance monitoring (PM) of DWDM networks. Merely as an example, the invention has been applied to digital performance monitoring of fully OEO regenerating DWDM networks based on integrated DWDM transmitter receiver arrays, but it should be recognized that the invention has a broader range of applicability.

Dense wavelength division multiplexing (DWDM), since its deployment in 1990s, has become a driving force for the rapid growth of various traffic in the long haul, regional, as well as metro area networks. Recent convergence of video, voice, and data, and the explosion of new applications such as video podcasting and peer-to-peer file sharing pose significant challenges to DWDM engineers to meet the dynamic wavelength demands for user services. For example, the traditional DWDM networks are based on Erbium Doped Fiber Amplifiers (EDFAs), Dispersion Compensating Modules (DCMs), and fixed optical add-drop multiplexers (OADMs) and often unable to provision unplanned wavelength services. Supporting a new service in a current DWDM network often translates to the extended downtime of the network, increasing significantly service provider's operation expenses. To accommodate the changes due to service demands and traffic growth, it is often desirable for service providers to simplify their DWDM networks and move towards more efficient and flexible network managements while still maintaining high levels of reliability. Thus, it is desirable for new DWDM networks to meet basic requirements, such as simplicity, flexibility, robustness and bandwidth utilization efficiency.

Reconfigurable optical add-drop multiplexers (ROADM) is one of the promising optical solutions developed recently to meet the rapid increase of wavelength-service demands. With ROADM, service providers can dynamically provision the networks, adding new services and/or reallocating unused capacity. However, ROADM often has addressed only the flexibility aspect of the DWDM networks, leaving unresolved other issues such as simplicity, robustness, and bandwidth utilization efficiency. In some cases, ROADM actually can complicate these issues. For example, in a ROADM-based ring network for metro applications, dynamic provisioning with ROADM often requires sophisticated optical power management algorithms with pre-knowledge of the new configuration to be able to re-evaluate parameters such as OSNR and mix-n-match penalty. Any change in network configuration with ROADM usually result in a performance change of every link in the network due to shared nature of EDFAs. Adding a new node can further complicate the ROADM-based networks and usually requires re-engineering because of, for example, inadequate OSNR.

On the other hand, recent development of integrated DWDM transmitter/receiver offers a potential solution to the next generation DWDM networks. For example, the arrayed DWDM LR transmitters/receivers may allow optical signals of different wavelengths to be first converted to electrical signals at every node regardless of their final destinations and reconverted back to optical signals, if not to be dropped, for transmission over fiber to the downstream node. This full regeneration approach in principle can eliminate Erbium Doped Fiber Amplifiers (EDFAs) and Dispersion Compensating Modules (DCMs) and hence the optical power management considerably the DWDM networks. In addition, with the use of a high-speed N×N electrical switch in the line card, one can configure the node to become effectively an enhanced ROADM node that offers signal regeneration and ROADM functions simultaneously. Furthermore, bandwidth efficiency and robustness (excluding fiber cut) often can be realized by using 1:N shared protection of transponder arrays. Studies show that with 1:12 protection regeneration using arrayed transponders can have better reliability than an EDFA.

But the integrated DWDM transmitter/receiver arrays, although promising from the performance point of view, are costly as a replacement for EDFAs and/or ROADM. It is usually not economically viable unless the cost of two such array units (which makes a re-generation/ROADM node) becomes less than that of an EDFA plus an ROADM. For example, the monolithic integration on InP can not meet this cost target. Even with recently proposed low-cost hybrid integration, the use of arrayed transponders to replace an EDFA and ROADM is still too costly to justify its deployment in many applications. For example, the associated electronic components such as FEC chips are the cost bottleneck.

Hence it is highly desirable to improve techniques for DWDM systems.

BRIEF SUMMARY OF THE INVENTION

The present invention relates in general to telecommunication techniques. More particularly, the invention provides a system and method for cost-effective digital performance monitoring (PM) of DWDM networks. Merely as an example, the invention has been applied to digital performance monitoring of fully OEO regenerating DWDM networks based on integrated DWDM transmitter receiver arrays, but it should be recognized that the invention has a broader range of applicability.

According to an embodiment, the present invention provides a system for performance monitoring for a DWDM network. The system includes a first photonic integrated device configured to receive a first optical signal and output a first plurality of electrical signals for a first plurality of channels respectively. The first plurality of channels corresponding to a first plurality of wavelength ranges associated with the first optical signal. The system also includes a first clock and data recovery device configured to receive the first plurality of electric signals and retime the first plurality of electric signals. Additionally, the system includes a first switch device coupled to the first clock and data recovery device without an error correction device coupled between the first clock and error recovery device and the first switch device. A first interface in the first switch device is configured to output a second plurality of electrical signals, and a second interface in the first switch device is configured to add or drop one or more channel devices. The system further includes an output port in the first switch device configured to provide information associated with one of the first plurality of channels. An error detection device is coupled to the output port and is configured to monitor and report performance of the one of the first plurality of channels.

In a specific embodiment, the output port is configured to provide a replica of one of the first plurality of channels. In an embodiment, the error detection device includes a forward error correction decoder. In another embodiment, system further includes a second switch device coupled to the output port and the error detection device, the second switch device being configured to select one of the first plurality of channels. In an embodiment, the error detection device monitors the error rate of the channel continuously and allows a corresponding line-side receiver to adjust its decision threshold for a lowest bit error rate. In a specific embodiment, the bit error rate (BER) of each channel is monitored periodically via time division multiplexing. In a specific embodiment, the error detection device monitors the first plurality of channels sequentially, with each of the first plurality of channels being monitored for a time period of 2 OTU2 frames. In another embodiment, the system also includes a processor coupled to the switch and the error detection device. The processor is configured to issue instructions to the switch regarding channel selection and the time duration for monitoring.

In a specific embodiment of the system, the first photonic integrated device includes an arrayed waveguide grating device configured to receive the first optical signal, demultiplex the first optical signal, and generate a plurality of optical signals corresponding to the first plurality of wavelength ranges and a plurality of transponders configured to receive the plurality of optical signals respectively and convert the plurality of optical signals into the first plurality of electrical signals respectively. In an embodiment, the first clock and data recovery device is further configured to recover a clock signal for each of the first plurality of electric signals and retime each of the first plurality of electric signals based on at least information associated with the clock signal.

According to an alternative embodiment of the invention, a method is provided for performance monitoring for a DWDM network. The method includes receiving a first optical signal and outputting a first plurality of electrical signals for a first plurality of channels respectively. The first plurality of channels corresponding to a first plurality of wavelength ranges associated with the first optical signal. The method also includes receiving the first plurality of electric signals and recovering clock and data timing information associated with the first plurality of electric signals. The method further includes providing the recovered information associated with the first plurality of electric signals to a first cross-point switch device without error correction. The first cross-point switch includes a first interface configured to output a second plurality of electrical signals to another system. The first cross-point switch also includes a second interface configured to add or drop one or more channel devices. Additionally, the method also includes causing the cross-point switch device to provide information associated with one of the first plurality of electrical signals. A error detection device is used to receive to information associated with one of the first plurality of electrical signals and to monitor and report performance of one of the first plurality of channels.

In a specific embodiment of the method, a photonic integrated device is used for receiving the first optical signal and outputting the first plurality of electrical signals. In an embodiment, a first clock and data recovery device is used for receiving the first plurality of electric signals and recovering clock and data information associated with the first plurality of electric signals. In an embodiment, the error detection device comprises a forward error correction decoder. In a specific embodiment, the first cross-point switch includes an output port configured to provide a replica of one of the electrical signals. In another embodiment the first cross-point switch device also includes a second switch device, which is configured to select one of the first plurality of channels for performance monitoring. In an embodiment, the error detection device monitors the error rate of the channel continuously and allows the corresponding line-side receiver can adjust its decision threshold for a lowest bit error rate.

In an embodiment of the method, the bit error rate (BER) of each channel is monitored periodically via time division multiplexing. In a specific embodiment, the error detection device monitors the first plurality of channels sequentially, each of the channels being monitored for a time period of 2 OTU2 frames. In another embodiment, the method also includes using a processor coupled to the cross-point switch device and to the error detection device to provide instructions regarding channel selection and the time duration for monitoring.

Many benefits are achieved by way of the present invention over conventional techniques. For example, according to an embodiment of the invention, techniques are provided for a simple, low-cost solution to digital performance monitoring of multi-channel 3R regeneration unit, opening up the possibility of commercializing DOADX for metro/regional transport networks. In an embodiment, the bring-up mode provides a means to optimize line-side interfaces for improved link budget. Therefore, no mix-n-match penalty needs to be considered in network engineering. In a specific embodiment, the troubleshooting mode provides a hardware platform for implementing shared protection in case of performance degradation due to span/hardware failures. Such a protection mechanism can lead to a considerable increase in network bandwidth utilization. According to embodiments of the invention, implementation of these techniques in conjunction with a cross-point switch, such as in the case of the DOADX, requires only minimal additional hardware, such as a single FEC decoder per PID per direction. In an embodiment, network upgrade including the addition/removal of services (channels) requires little extra hardware for digital PM. In another embodiment, networks built with the current invention can be configured for plug-n-play with no/limited network engineering. Additional power consumption from the digital PM (i.e., a single FEC decoder) is low, on the order of a few watts. Moreover, direct measurement of bit error rate (BER) also provides higher reliability. Compared to optical PM devices such as an optical spectral analyzer, embodiments of the current invention have advantages in cost, compactness, power consumption as well as reliability.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a system and method for cost-effective digital performance monitoring (PM) of DWDM networks. Merely as an example, the invention has been applied to digital performance monitoring of fully OEO regenerating DWDM networks based on integrated DWDM transmitter receiver arrays, but it should be recognized that the invention has a broader range of applicability.

Recent efforts in the photonic integrated circuits (PIC) or photonic integrated devices (PID) technologies have opened the possibilities of building new optical networks that are simpler, more flexible, more robust, and more bandwidth efficient to support rapid changes in service demands and traffic growth. Networks built with these technologies will have no/limited optical power management, enable automated end-to-end service provisioning and topology discovery, and offer shared wavelength protection for efficient equipment/bandwidth utilization. These features are increasingly demanded by network operators.

However, conventional techniques for configuring a regeneration node have many limitations. For example, in some convention systems, part of the system is exposed to uncorrected errors. Errors from transmission over high-speed backplane and poor jitter performance of the switches can accumulate from node to node, degrading the overall transmission performance. Other convention systems may provide more extensive error correction capabilities, but these system tend to have substantially higher deployment cost.

In conventional reconfigurable optical add-drop multiplexer/optical cross-connect (ROADM/OXC) networks, the re-configurability introduces additional complexity in the network management and engineering. Sophisticated algorithms for optical power management with pre-knowledge of the new configuration are needed for dynamic provisioning to rapidly evaluate link performance for every channel. Any change in configuration will result in changes of optical signal-to-noise ratio (OSNR) and mix-n-match penalty due to the shared nature of EDFAs as well as the different transmitter/receiver pair performance. Addition/removal of a new node will further complicate the ROADM based networks and often requires re-engineering as a result of inadequate OSNR and link budget for example.

In all-optical networks where conventional ROADMs are deployed, performance monitoring of intermediate segments using for example optical spectral analyzer may be present to detect power and OSNR of each channel. However, service providers often don't use such a monitoring feature in metro/regional networks due to its high capital expenses.

Hence it is highly desirable to improve techniques for integrated reconfigurable DWDM systems.

Figure 1:
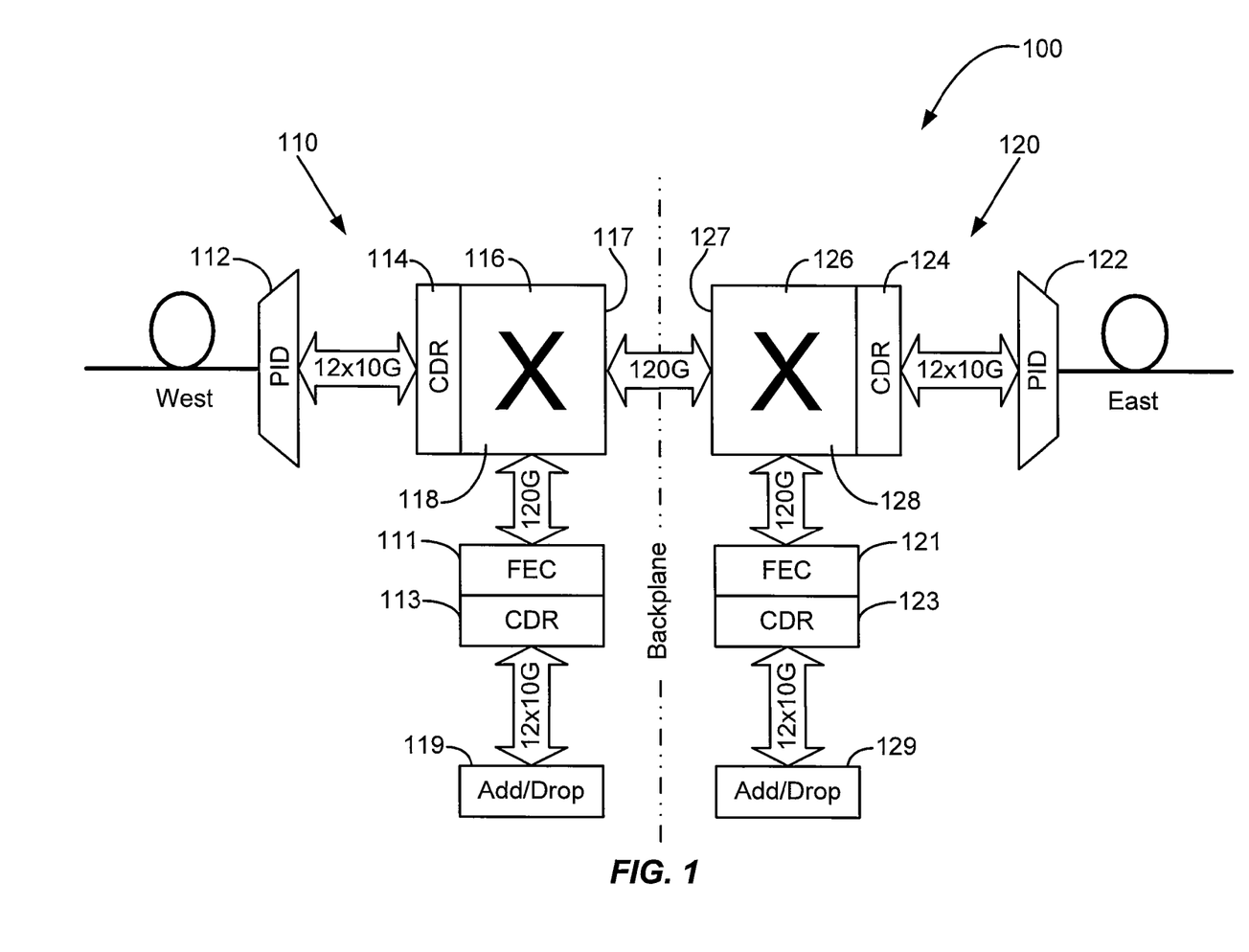
FIG. 1 is a simplified diagram illustrating a system for DWDM line card according an embodiment of the present invention.

According to an embodiment of the present invention, a fully regenerating DWDM networks can be built on multi-function line-cards including arrayed DWDM transponders based on either PIC or PID technology. The networks with proper configurations offer features such as reconfigurable optical add-drop multiplexer (ROADM), optical cross connect (OXC) as well as 3R (re-amplifying, re-shaping, and re-timing) regeneration for pass-through traffic as shown in FIG. 1. Each OEO node in the networks becomes a fully regenerating ROADM/OXC node. With clock and data recovery (CDR) circuits at both input and output of its O/E interfaces, it is also a multi-channel, multi-degree 3R regeneration unit. Therefore, each node is effectively a digital optical add-drop cross-connect (DOADX).

FIG. 1 is a simplified diagram illustrating a system for DWDM line card according an embodiment of the present invention. This diagram is merely an example, which should not unduly limit the scope of the claims. One of ordinary skill in the art would recognize many variations, alternatives, and modifications. In the specific example of FIG. 1, system 100 can be used as a digital optical add-drop cross-connect (DOADX) node. As shown, system 100 illustrates an approach to configuring a regeneration/ROADM node using two 12-channel line cards, 110 and 120, as an example. Line card 110 includes a photonic integrated device (PID) 112, a clock and data recovery (CDR) device 114, a switch 116, a first interface 117, and a second interface 118. Similarly, line card 120 includes a photonic integrated device (PID) 122, a clock and data recovery (CDR) device 124, a switch 126, a first interface 127, and a second interface 128.

In a specific embodiment, photonic integrated device 112 has 12 DWDM transponders wavelength multiplexed/demultiplexed by an AWG. In this approach, 10 G optical signals of different wavelengths from an upstream node, e.g. from the West as shown in FIG. 1, are first converted in parallel to electrical signals by the PID. The clock and data recovery circuit 114 is used to recover the clock in the received optical data in each channel and retime the data for its continued transmission along the link. The 12 channels are then directed to either the tributary for add/drop via interface 118, or through backplane connection via interface 117 to interface 127 of another line card 120. The line card 120 recovers the clock and retimes the data in CDR 124, and uses PID 122 to convert the electrical signals back to optical signals for transmission over fiber to the downstream node, e.g. in the East direction as shown in FIG. 1. If a 12×12 non-blocking switch at 10 G is used, such a node is effectively a ROADM node with full regeneration for pass-through channels.

As shown in FIG. 1, line card 110 also includes a second interface 118, which is coupled to a tributary for add/drop additional channel devices. As shown in FIG. 1, interface 118 is coupled to a forward error correction (FEC) device 111, a clock and data recovery (CDR) device 113, and an add/drop interface device 119. In one embodiment, the add/drop interface device 119 is configured to receive an electrical signal from the clock and recovery device 113, convert the electrical signal to an optical signal, and output the optical signal to one or more user channel devices which can be added or dropped from the network. In FIG. 1, add/drop interface device 119 has the capacity to add or drop 12 channels of 10 G each. Each channel is corrected for transmission errors by an optical transport processor with build-in forward error correction (FEC) feature. In another embodiment, the add/drop interface device 119 is configured to receive an optical signal from a user channel, convert the optical signal to an electrical signal, and output the electrical signal to the clock and recovery device 113. In a specific embodiment, the add/drop interface device 119 may include a photonic integrated device (PID).

Similarly, line card 120 also includes a second interface 128 coupled to a tributary for add/drop additionally channel devices. As shown in FIG. 1, line card 120 includes FEC 121, CDR 123, and add/drop interface device 129, which function in similar ways as FEC 111, CDR 112, and add/drop interface device 119, respectively.

Although the above has been shown using a selected group of components for the system 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

The photonic integrated devices (PID) 112 is configured to receive an optical signal from the line side or output an optical signal to the line side. Additionally, the photonic integrated device 112 is configured to output or receive a plurality of electrical signals for a plurality of channels respectively. The plurality of channels corresponds to a plurality of wavelength ranges for the received or outputted optical signal.

According to an embodiment, the photonic integrated device 112 includes an arrayed waveguide grating device and a plurality of transponders. For example, the arrayed waveguide grating device is configured to receive the optical signal from the line side, demultiplex the received optical signal, and output a plurality of optical signals corresponding to the plurality of wavelength ranges. In another example, the plurality of transponders is configured to receive the plurality of optical signals respectively and convert the plurality of optical signals into the plurality of electrical signals respectively.

The clock and data recovery device 114 is coupled to the photonic integrated device 112. For example, the clock and data recovery device 114 is configured to receive the plurality of electric signals from the photonic integrated device 112. In another example, the clock and data recovery device 114 is further configured to recover a clock signal for each of the plurality of electric signals and retime each of the plurality of electric signals according to the clock signal. In yet another example, the clock and data recovery device is used for receiving the electric signals and recovering clock and data information associated with the electric signals.

The switch 116 is coupled to the clock and data recovery device 114 and the interfaces 117 and 118. In a specific embodiment, the switch device 116 is coupled to the clock and data recovery device without an error correction device coupled between the clock and error recovery device 114 and the switch device 116. For example, the switch 116 is coupled to the clock and recovery device 114 without through any forward error correction (FEC) device. For each of the plurality of electrical signals, the switch 116 is capable of directing the each of the plurality of electrical signals to one of the one or more plugged channel devices through interface 118.

The interface 118 is configured to add or drop one or more channel devices through the add/drop interface device 119. The add/drop interface device 119 are configured to add or drop one or more electrical signals for one or more channels respectively. In one embodiment, each of the one or more channel devices includes a forward error correction (FEC) device. For example, in a specific embodiment, each of the one or more channel devices can include one forward error correction device (FEC) and other component or components that do not include any forward error correction device. In another example, the system 110 includes a parent card and a child card for each of the one or more channel devices. Each child card may include an FEC, a CDR, and a add/drop interface. In one embodiment, the child card is known as a daughter card. In another embodiment, the child card is capable of being plugged into the parent card through the interface 118.

As shown in FIG. 1 and described above, each optical-electrical-optical (OEO) node, such as system 100, in the networks becomes a fully regenerating ROADM/OXC node. With clock and data recovery (CDR) circuits at both input and output of its O/E interfaces, it is also a multi-channel, multi-degree 3R regeneration unit. Therefore, each node is effectively a digital optical add-drop cross-connect (DOADX).

Functionally, such a node is similar to an optical cross-connect (OXC) node plus a ROADM node in all optical networks, with the exception that the signals are now full 3R regenerated and hence are of much better quality. In comparison to the conventional ROADM/OXC node, a DOADX node has significant advantages especially for metro/regional networks where flexibility and cost are the main concerns. By deploying such a node, service providers can choose to add/drop any channels, protect any channel in case it fails, and route pass-through wavelengths to any output ports without blocking. The latter two features are not available with the conventional ROADM. In addition, the 3R regeneration eliminates the need of EDFAs in many metro/regional networks and therefore, simplifies considerably the network management and engineering. Compared to an all-optical link, the DOADX approach has other added advantages including longer reach and simplified network engineering.

Figure 2:
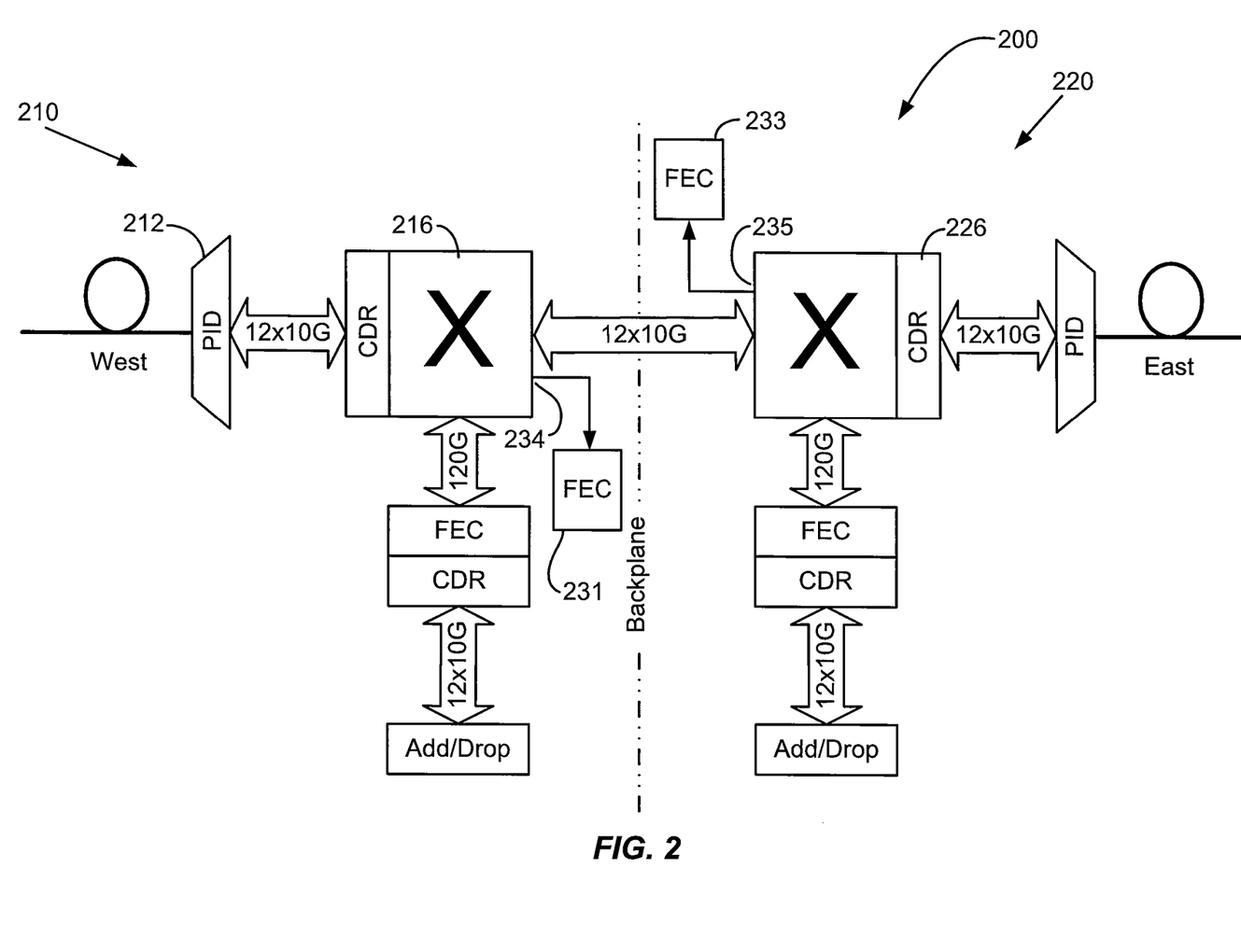
FIG. 2 is a simplified diagram illustrating a performance monitoring system for digital optical add-drop cross-connect (DOADX) node according an embodiment of the present invention.

FIG. 2 is a simplified diagram illustrating a performance monitoring system for digital optical add-drop cross-connect (DOADX) node according to an embodiment of the present invention. This diagram is merely an example, which should not unduly limit the scope of the claims. One of ordinary skill in the art would recognize many variations, alternatives, and modifications. As shown, system 200 illustrates an approach to configuring a regeneration/ROADM node using two 12-channel line cards, 210 and 220, as an example. Line cards 210 and 220 are similar to line cards 110 and 120 of FIG. 1, respectively. Both 210 and 220 include photonic integrated device (PID), a clock and data recovery (CDR) device, a switch device, a first interface, and a second interface. The operations of these functional units are similar to those corresponding functional units in FIG. 1 discussed above.

According to a specific embodiment, techniques are provided for using a digital monitoring chip to detect the received digital errors from all pass-through channels in a PID one-by-one via time-division multiplexing (TDM). In some embodiments of the invention, the digital monitoring chip can include error detection devices. In a specific embodiment, the signals of all channels are of identical FEC encoding frame. In this embodiment, a forward error correction device (FEC) can be used to decode the signals and provide error detection capabilities. Examples of the error detection devices in the digital monitoring chips are shown in FIG. 2 as a forward error correction device (FEC) 231 in line card 210 and a forward error correction device (FEC) 233 in line card 220.

In FIG. 2, FEC 231 is coupled to switch 216 via interface port 234. In a specific embodiment, this additional port can be obtained by using a (N+1)×(N+1) switch coupled to PID 212, where N is the number of channels. In the specific example of FIG. 2, there are 12 channels, and N is equal to 12. In a specific embodiment, the output of the port 234 is programmed to be a replica of one of the pass-through channels via multicasting, which is a feature in cross-point switch 216 in a specific embodiment. The replica is then fed into the FEC decoder 231 to determine the rate of errors accumulated over the transmission from the add node and the results are reported to optical power manager (OPM), which is a part of the network management software suite (not shown). The OPM is configured take proper actions, such as changing decision threshold of the corresponding line-side receiver according to an embodiment of the invention. Similarly, FEC 233 is coupled to switch 226 via port 235 to provide digital monitoring function in line card 220.

According to embodiments of the present invention, the switches, e.g. 216 and 226, can be programmed to monitor pass-through channels specified by users in any desired order. In a specific embodiment, there are three basic modes of operations for the digital performance monitor (PM) unit: network bring-up mode, normal operation mode, and troubleshooting mode. More details about these modes of operations are discussed below.

In the bring-up mode, the switch replicates the output of one pass-through channel upon the request from OPM. This channel is often the first one to be provisioned for service by OPM. The switch lets the FEC monitor the error rate of the channel continuously until it receives a request otherwise. During this time period, the corresponding line-side receiver can adjust its decision threshold for the lowest bit error rate (BER). Once the optimal threshold is reached, OPM will request for a move to the next channel and repeat the process until all receivers of the pass-through channels of the node are optimized.

The normal operation mode is used when the optimization of decision threshold is completed for all channels. Under this condition, the bit error rate (BER) of each pass-through channel is monitored periodically via TDM with desired sampling algorithms. The fastest sampling rate for 10 G channels with FEC is determined by the length of an optical transport frame i.e., OTU2 which has 130,560 bits or a length of 13.056 μs (see ITU G.709). This sampling rate is dependent of the number of pass-through channels present. For a node with 10 pass-through channels at 10 G for example, the fastest sampling rate per channel is 7.7 KHz. In reality, this rate often is much lower due to the asynchronous nature of the cross-point switch and a rate below 3.8 KHz is more likely.

The troubleshooting mode is deployed when errors of a channel under monitoring exceeds a pre-defined threshold level reported by any FEC encoder along the link including the one at the drop node. Under this condition, the FEC decoder is switched to the problem channel, measures the error rate for an extended period of time, reports the results to OPM, and switches back to its normal operation mode.

According to embodiments of the present invention, techniques are provided for the decision point optimization of the line-side receiver, digital performance monitoring at every node, and a hardware platform for shared protection. These features are generally either not available in conventional technologies or are too costly to justify their deployments in metro/regional networks. In contrast, the cost for implementing the techniques provided by embodiments of the current invention is modest. In a specific embodiment, the cost includes, for example, one FEC decoder per PID per direction.

In DOADX based networks such as shown in FIG. 2, eliminating FEC at the line side enables a more economic implementation of the network. Introducing an error detection device, such as FEC 231, to an additional port 234 of switch 216 provides capability for performance monitoring for the pass-through channels. This capability allows the system to optimize the decision point of the line-side receivers. As a result, mix-n-match penalty of transponders can be reduced in network engineering. This penalty can be as large as 2 dB in the case where directly modulated lasers (DML) are used, impacting network link budget. This monitoring capability also allows local identification of performance degradation of intermediate transponders, thus eliminating the needs to measure the degradation at the drop side, complicating the troubleshooting procedures.

Another advantage of introducing FEC 231 is that shared protection can be implemented. Shared protection is a desired feature inherent to 3R regeneration at every node. With shared protection, local 1:N protection can be deployed for the failed segment, leaving the rest of the network untouched for improved bandwidth utilization. The additional FEC coupled to the switch enables shared protection by providing the capability to monitor every channel in each 3R regeneration node. Without the performance monitoring, if one channel at a node fails, the entire link is squelched like in the case of an all-optical link because the network is unable to locate the problem segment.

Figure 3:
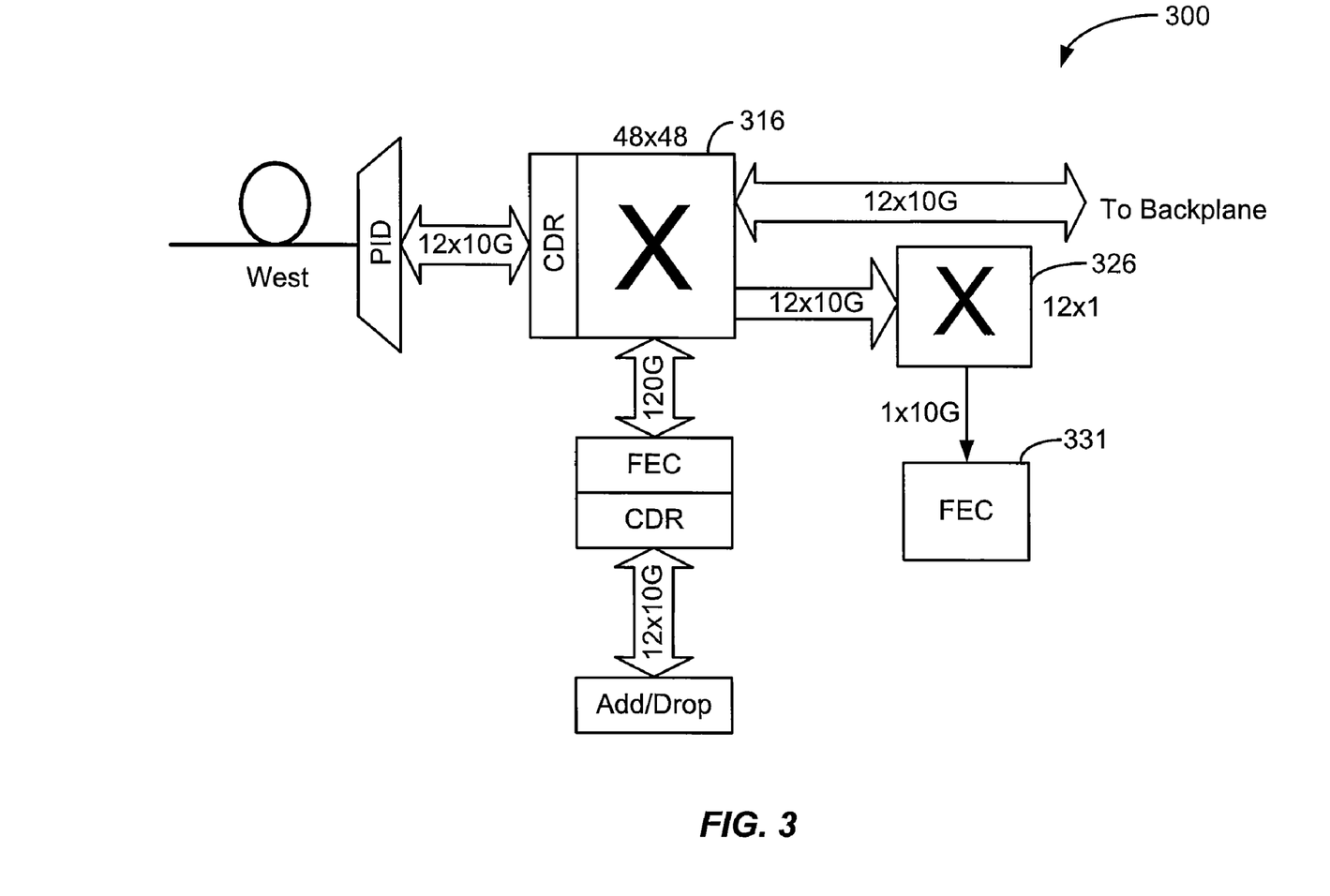
FIG. 3 is a simplified diagram illustrating a performance monitoring system for digital optical add-drop cross-connect (DOADX) node according another embodiment of the present invention.

FIG. 3 is a simplified diagram illustrating a performance monitoring system for digital optical add-drop cross-connect (DOADX) node according another embodiment of the present invention. This diagram is merely an example, which should not unduly limit the scope of the claims. One of ordinary skill in the art would recognize many variations, alternatives, and modifications. As shown, a 48×48 cross-point switch 316 is used followed by a 12×1 switch 326. In a specific embodiment, switch 316 generates 12 one-to-one replicas of the 10 G pass-through channels via multicasting and feed to the 12×1 switch 326 for time division multiplexing (TDM) detection by an FEC decoder 331. Here, a forward error correction device (FEC) can be used as an error detection device to decode the signals and provide error detection capabilities. In this design, multicasting configuration is static, whereas channel switching is dynamic, which may increase the switching speed slightly. In alternative embodiments, other designs are also possible to accomplish digital performance monitoring tasks by replicating the output channels in a TDM fashion and detecting with an FEC decoder.

Figure 4:
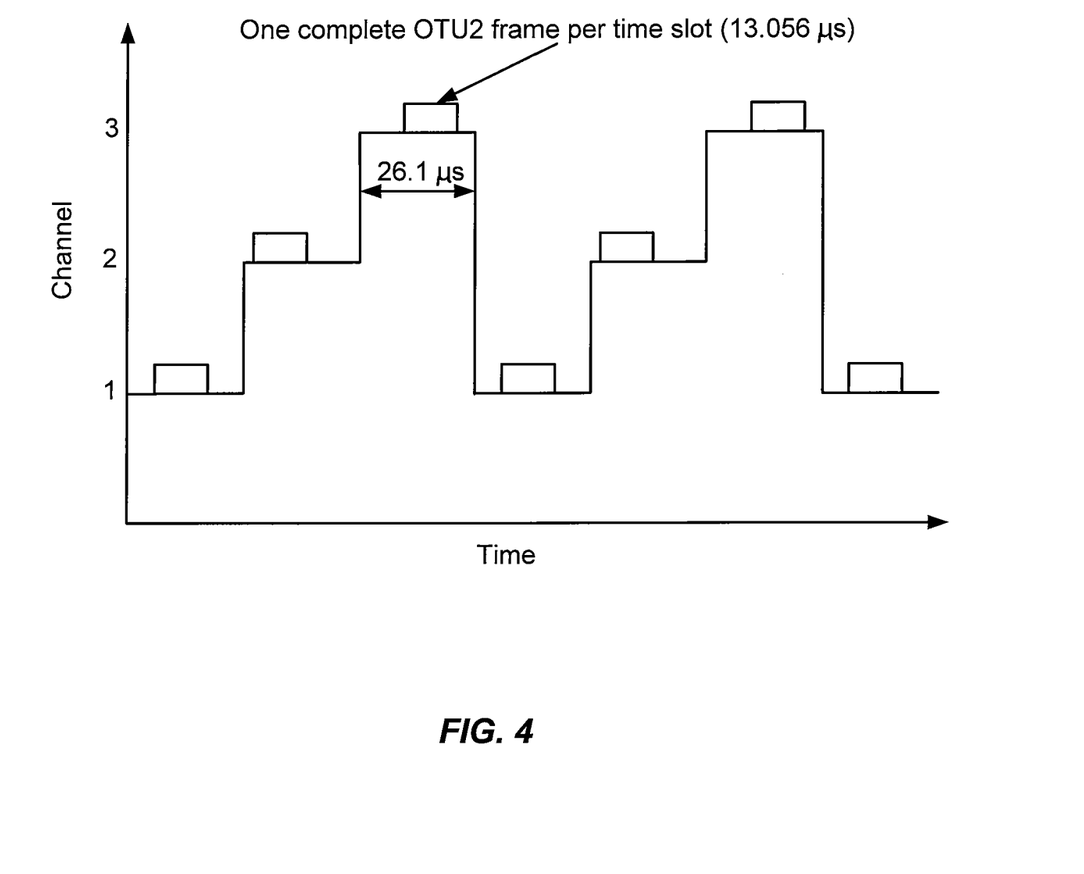
FIG. 4 is a simplified diagram illustrating a method for monitoring channel performance using a digital optical add-drop cross-connect (DOADX) node according to an embodiment of the present invention.

FIG. 4 is a simplified diagram illustrating a method for monitoring channel performance in a digital optical add-drop cross-connect (DOADX) node according to an embodiment of the present invention. This diagram is merely an example, which should not unduly limit the scope of the claims. One of ordinary skill in the art would recognize many variations, alternatives, and modifications. FIG. 4 shows an example of TDM switching for 3 pass-through channels to be monitored in the normal operation mode according to yet another embodiment of the invention. Here the FEC decoder reads channels 1, 2, and 3 sequentially and at each channel the switch stays for a time period equal to 2 OTU2 frames (26.1 μs for OTU2) to ensure the capture of one complete frame due to the asynchronous nature of the switch. For comparison, single-channel switching speed of a cross-point switch is typically 20-30 ns, substantially shorter than an OTU2 frame. The detected errors are then reported back to a monitoring system. An example of the monitoring system is discussed below. In alternative embodiments, other switching orders like random switching can also be used here.

Figure 5:
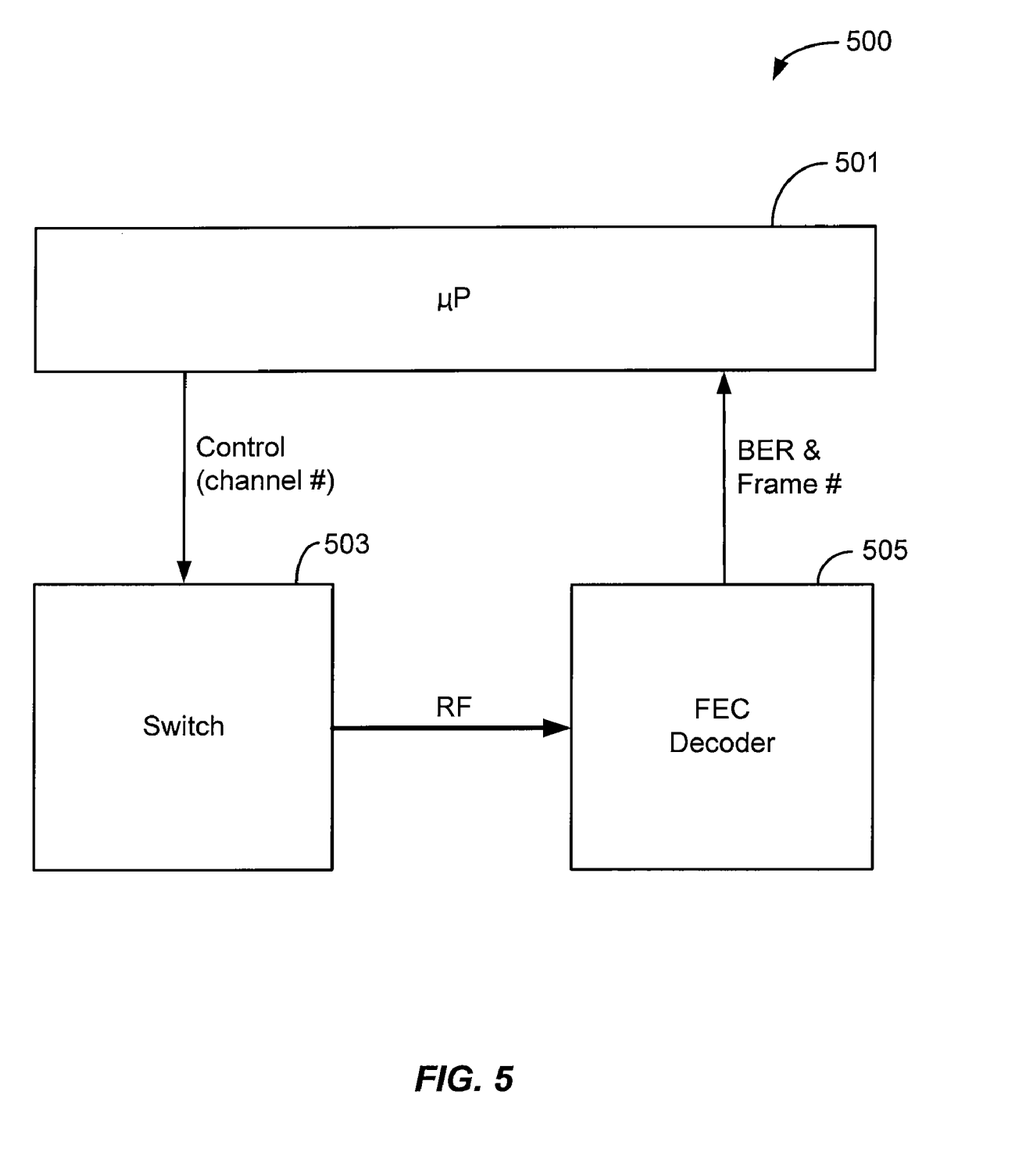
FIG. 5 is a simplified diagram illustrating a digital performance monitor (PM) system according an alternative embodiment of the present invention.

FIG. 5 is a simplified diagram illustrating a digital performance monitor (PM) system according an alternative embodiment of the present invention. This diagram is merely an example, which should not unduly limit the scope of the claims. One of ordinary skill in the art would recognize many variations, alternatives, and modifications. According to a specific embodiment of the invention, each channel may use different time slots based on their measured digital performance. For channels whose reported errors are marginal, one can measure more frames before switching to the next channel. In this case, one can assign each channel with a different frame numbers to be monitored. For example, the digital PM monitors one OTU2 frame for Channels 1 and 2 that have low error rates and 3 OTU2 frames for Channel 3 due to its higher BER. In FIG. 5, the digital PM monitor system 500 includes a microprocessor 501 coupled to a switch device 503 and an FEC decoder 505. FEC decoder 505 is also coupled to the switch device 503. In this embodiment, the FEC decoder is used as an error detection device to decode the signals and provide error detection capabilities. In a specific example, the microprocessor 501 issues instructions to the switch 503 regarding which channel to monitor and the time slots duration for monitoring. The switch device 503 sends electrical signals from the selected channel to FEC decoder 505 for monitoring. FEC decoder 505 then sends channel information including BER and frame number to the microprocessor 501 for analysis. The bring-up and troubleshooting modes can be considered as a variation from the example described above. Of course, there can be other variations, modifications, and alternatives.

Depending on the embodiments, the present invention includes various features. These features may include the following.

- A single digital performance monitor (an error detection device, e;g., an FEC decoder) is used to monitor via TDM the digital performance of multichannel 3R regeneration transport devices;
- A cross-point switch is used to deliver each of the multichannel signals to the digital monitor;
- The cross-point switch is used in a multi-channel line card to optimize the decision threshold of the corresponding optical line-side receiver for improved link budget;
- The performance monitoring via TDM offers a low cost hardware platform for shared equipment protection; and
- Different modes of operation can be programmed for normal performance monitoring, network bring-up as well as troubleshooting.

As shown, the above features may be in one or more of the embodiments. These features are merely examples, which should not unduly limit the scope of the claims herein. One of ordinary skill in the art would recognize many variations, modifications, and alternatives.

Many benefits are achieved by way of the present invention over conventional techniques. For example, according to an embodiment of the invention, techniques are provided for a simple, low-cost solution to digital performance monitoring of multi-channel 3R regeneration unit, opening up the possibility of commercializing DOADX for metro/regional transport networks. In an embodiment, the bring-up mode provides a means to optimize line-side interfaces for improved link budget. Therefore, no mix-n-match penalty needs to be considered in network engineering. In a specific embodiment, the troubleshooting mode provides a hardware platform for implementing shared protection in case of performance degradation due to span/hardware failures. Such a protection mechanism can lead to a considerable increase in network bandwidth utilization. According to embodiments of the invention, implementation of these techniques in conjunction with a cross-point switch, such as in the case of the DOADX, requires only minimal additional hardware, such as a single FEC decoder per PID per direction. In an embodiment, network upgrade including the addition/removal of services (channels) requires little extra hardware for digital PM. In another embodiment, networks built with the current invention can be configured for plug-n-play with no/limited network engineering. Additional power consumption from the digital PM (i.e., a single FEC decoder) is low, on the order of a few watts. Moreover, direct measurement of BER also provides higher reliability. Compared to optical PM devices such as an optical spectral analyzer, embodiments of the current invention have advantages in cost, compactness, power consumption as well as reliability.

It is also understood that the examples and embodiments described herein are for illustrative purposes only and that various modifications or changes in light thereof will be suggested to persons skilled in the art and are to be included within the spirit and purview of this application.

What is claimed is:

1. A system for performance monitoring for a DWDM network, the system comprising:
    a first photonic integrated device configured to receive a first optical signal and output a first plurality of electrical signals for a first plurality of channels respectively, the first plurality of channels corresponding to a first plurality of wavelength ranges associated with the first optical signal;
    a first clock and data recovery device configured to receive the first plurality of electric signals and retime the first plurality of electric signals;
    a first switch device coupled to the first clock and data recovery device without an error correction device coupled between the first clock and error recovery device and the first switch device;
    a first interface in the first switch device, the first interface being configured to output a second plurality of electrical signals;
    a second interface in the first switch device, the second interface configured to add or drop one or more channel devices;
    an output port in the first switch device configured to provide information associated with one of the first plurality of channels; and
    an error detection device coupled to the output port, the error detection device being configured to monitor and report performance of the one of the first plurality of channels.

2. The system of claim 1 wherein the output port is configured to provide a replica of one of the first plurality of channels.

3. The system of claim 1 wherein the error detection device coupled to the output port comprises a forward error correction decoder.

4. The system of claim 1 further comprising a second switch device coupled to the output port and the error detection device, the second switch device being configured to select one of the first plurality of channels.

5. The system of claim 1 wherein the error detection device monitors the error rate of the channel continuously and allows a corresponding line-side receiver to adjust its decision threshold for a lowest bit error rate.

6. The system of claim 1 wherein the bit error rate (BER) of each channel is monitored periodically via time division multiplexing.

7. The system of claim 6 wherein the error detection device monitors the first plurality of channels sequentially, each of the first plurality of channels being monitored for a time period of 2 OTU2 frames.

8. The system of claim 1 further comprising a processor coupled to the switch and the error detection device, the processor being configured to issue instructions to the switch regarding channel selection and the time duration for monitoring.

9. The system of claim 1 wherein the first photonic integrated device comprises:
an arrayed waveguide grating device configured to receive the first optical signal, demultiplex the first optical signal, and output a plurality of optical signals corresponding to the first plurality of wavelength ranges; and
a plurality of transponders configured to receive the plurality of optical signals respectively and convert the plurality of optical signals into the first plurality of electrical signals respectively.

10. The system of claim 1 wherein the first clock and data recovery device is further configured to recover a clock signal for each of the first plurality of electric signals and retime each of the first plurality of electric signals based on at least information associated with the clock signal.

11. A method for performance monitoring for a DWDM network, the method comprising:
receiving a first optical signal and outputting a first plurality of electrical signals for a first plurality of channels respectively, the first plurality of channels corresponding to a first plurality of wavelength ranges associated with the first optical signal;
receiving the first plurality of electric signals and recovering clock and data timing information associated with the first plurality of electric signals;
providing the recovered information associated with the first plurality of electric signals to a first cross-point switch device without error correction, the first cross-point switch including a first interface configured to output a second plurality of electrical signals to another system, the first cross-point switch including a second interface configured to add or drop one or more channel devices;
causing the cross-point switch device to provide information associated with one of the first plurality of electrical signals; and
using an error detection device to receive information associated with one of the first plurality of electrical signals and to monitor and report performance of one of the first plurality of channels.

12. The method of claim 11 wherein a photonic integrated device is used for receiving the first optical signal and outputting the first plurality of electrical signals.

13. The method of claim 11 wherein a first clock and data recovery device is used for receiving the first plurality of electric signals and recovering clock and data information associated with the first plurality of electric signals.

14. The method of claim 11 wherein the error detection device comprises a forward error correction decoder.

15. The method of claim 11 wherein the first cross-point switch includes an output port configured to provide a replica of one of the electrical signals.

16. The method of claim 11 wherein the first cross-point switch device further comprises a second switch device, the second switch device being configured to select one of the first plurality of channels for performance monitoring.

17. The method of claim 11 wherein the error detection device monitors the error rate of the channel continuously and allows the corresponding line-side receiver can adjust its decision threshold for a lowest bit error rate.

18. The method of claim 11 wherein the bit error rate (BER) of each channel is monitored periodically via time division multiplexing.

19. The method of claim 18 wherein the error detection device monitors the first plurality of channels sequentially, each of the channels being monitored for a time period of 2 OTU2 frames.

20. The method of claim 11 further comprising using a processor coupled to the cross-point switch device and to the error detection device to provide instructions regarding channel selection and the time duration for monitoring.

21. The method of claim 11 wherein the first photonic integrated device comprises:
an arrayed waveguide grating device configured to receive the first optical signal, demultiplex the first optical signal, and output a plurality of optical signals corresponding to the first plurality of wavelength ranges; and
a plurality of transponders configured to receive the plurality of optical signals respectively and convert the plurality of optical signals into the first plurality of electrical signals respectively.

22. The method of claim 11 wherein the first clock and data recovery device is further configured to recover a clock signal for each of the first plurality of electric signals and retime each of the first plurality of electric signals based on at least information associated with the clock signal.

* * * * *